(12) United States Patent
Gupta et al.

(10) Patent No.: US 10,430,351 B2
(45) Date of Patent: Oct. 1, 2019

(54) SYSTEMS AND METHODS FOR VIRTUAL SERVICE PROCESSOR DATA BRIDGING

(71) Applicant: Dell Products L.P., Round Rock, TX (US)

(72) Inventors: Chitrak Gupta, Bangalore (IN); Elie Antoun Jreij, Pflugerville, TX (US); Rama Rao Bisa, Kandakur (IN); Rajeshkumar Ichchhubhai Patel, Bangalore (IN); Neeraj Joshi, Puducherry (IN); Sushma Basavarajaiah, Bangalore (IN); Kala Sampathkumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 15/072,927

(22) Filed: Mar. 17, 2016

(65) Prior Publication Data
US 2017/0270060 A1 Sep. 21, 2017

(51) Int. Cl.
  *G06F 13/10* (2006.01)
  *G06F 13/20* (2006.01)
  *G06F 13/40* (2006.01)

(52) U.S. Cl.
  CPC ............ *G06F 13/102* (2013.01); *G06F 13/20* (2013.01); *G06F 13/4068* (2013.01); *Y02D 10/14* (2018.01); *Y02D 10/151* (2018.01)

(58) Field of Classification Search
  CPC ..... G06F 13/102; G06F 13/20; G06F 13/4068
  See application file for complete search history.

(56) References Cited

U.S. PATENT DOCUMENTS

| | | | | |
|---|---|---|---|---|
| 7,555,676 B2* | 6/2009 | Lopez, Jr. | ............ | G06F 11/2294 714/27 |
| 7,975,084 B1* | 7/2011 | Kalbarga | ............. | G06F 13/102 710/104 |
| 2003/0152078 A1* | 8/2003 | Henderson | ............. | H04L 29/06 370/389 |
| 2004/0268113 A1* | 12/2004 | Rothman | ............. | G06F 9/4401 713/2 |
| 2007/0168498 A1* | 7/2007 | Lambert | ............ | H04L 43/0817 709/224 |
| 2008/0189392 A1* | 8/2008 | Azagury | ................ | H04L 67/08 709/218 |
| 2013/0111197 A1* | 5/2013 | Nadon | ...................... | G06F 8/60 713/1 |
| 2013/0289926 A1* | 10/2013 | Maity | ................ | G06F 9/45533 702/130 |

(Continued)

*Primary Examiner* — Tim T Vo
*Assistant Examiner* — Phong H Dang
(74) *Attorney, Agent, or Firm* — Jackson Walker L.L.P.

(57) ABSTRACT

In accordance with embodiments of the present disclosure, an information handling system may include a processor, a peripheral device, and a service processor communicatively coupled to the processor and the peripheral device and configured to perform out-of-band management of the information handling system. The service processor may further configured to communicatively couple to a management controller having executing thereon a virtual service processor, receive a command associated with the peripheral device from the management controller, deliver the command to the peripheral device, receive data from the peripheral device, and communicate the data to the management controller.

20 Claims, 4 Drawing Sheets

(56) References Cited

U.S. PATENT DOCUMENTS

2014/0013388 A1* 1/2014 Chandrasekhar ....... G06F 21/70
 726/3
2015/0248315 A1* 9/2015 Ragupathi ........... H04L 41/0806
 709/226

* cited by examiner

SYSTEMS AND METHODS FOR VIRTUAL SERVICE PROCESSOR DATA BRIDGING

TECHNICAL FIELD

The present disclosure relates in general to information handling systems, and more particularly to systems and methods by which, within a set of service processors, a powerful service processor of the set may manage the lighter service processors in the set with a virtual service processor to undertake data processing of the lighter service processors.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems evolve, increasing concern is placed on power consumption in such systems. Thus, it may be desirable to reduce power consumption when possible.

SUMMARY

In accordance with the teachings of the present disclosure, the disadvantages and problems associated with service processor processing in information handling systems may be reduced or eliminated.

In accordance with embodiments of the present disclosure, an information handling system may include a processor, a peripheral device, and a service processor communicatively coupled to the processor and the peripheral device and configured to perform out-of-band management of the information handling system. The service processor may further configured to communicatively couple to a management controller having executing thereon a virtual service processor, receive a command associated with the peripheral device from the management controller, deliver the command to the peripheral device, receive data from the peripheral device, and communicate the data to the management controller.

In accordance with these and other embodiments of the present disclosure, a method may include receiving at a service processor of an information handling system a command associated with a peripheral device of the information handling system from a management controller communicatively coupled to the service processor, wherein the management controller has executing thereon a virtual service processor. The method may also include delivering the command to the peripheral device. The method may also include receiving data from the peripheral device. The method may further include communicating the data to the management controller.

In accordance with these and other embodiments of the present disclosure, a management controller configured to perform out-of-band management of at least one information handling system may include a processor and a virtual service processor comprising a program of executable instructions embodied in non-transitory computer readable media, the virtual service processor configured to, when executed implement a user interface for management and control of a service processor communicatively coupled to the management controller, receive user instructions for controlling a peripheral device communicatively coupled to the service processor, and communicate a command to the service processor responsive to receiving the user instructions, the command for causing the service processor to communicate the command to the peripheral device.

In accordance with these and other embodiments of the present disclosure, a method may include implementing a user interface for management and control of a service processor communicatively coupled to a management controller configured to perform out-of-band management of at least one information handling system, receiving user instructions for controlling a peripheral device communicatively coupled to the service processor, and communicating a command to the service processor responsive to receiving the user instructions, the command for causing the service processor to communicate the command to the peripheral device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

Figure 1:
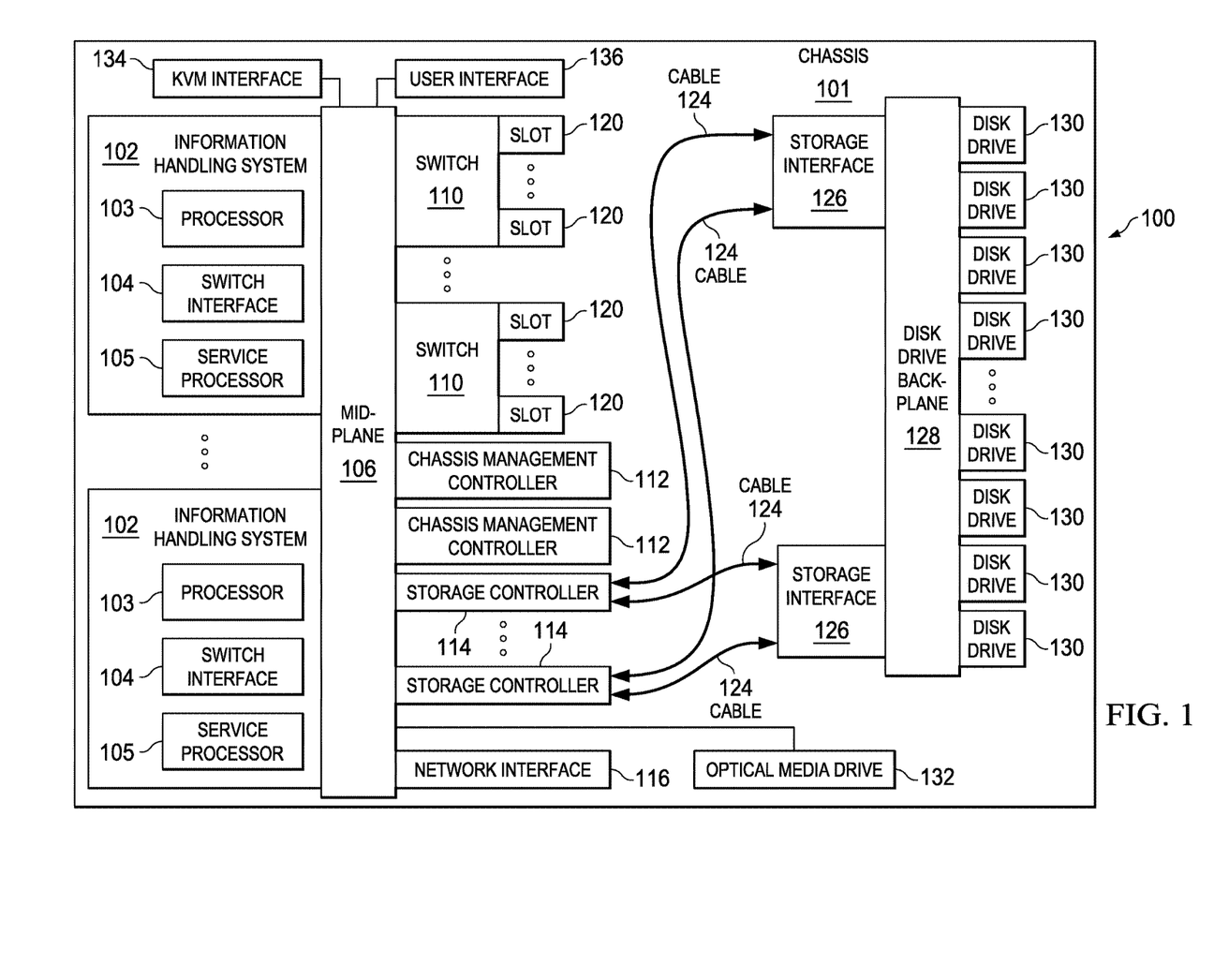
FIG. 1 illustrates a block diagram of an example system chassis with multiple information handling systems and with various peripheral and I/O capabilities common to the chassis as a whole, in accordance with embodiments of the present disclosure.

FIG. 1 illustrates a block diagram of an example system 100 having a chassis 101 with multiple information handling systems 102 and with various peripheral and I/O capabilities common to chassis 101 as a whole, in accordance with embodiments of the present disclosure. As depicted in FIG. 1, system 100 may comprise a chassis 101 including a plurality of information handling systems 102, a mid-plane 106, one or more switches 110, one or more chassis management controllers 112, a network interface 116, one or more slots 120, one or more cables 124, one or more storage interfaces 126, a disk drive backplane 128, a plurality of disk drives 130, an optical media drive 132, a keyboard-video-mouse ("KVM") interface 134, and a user interface 136.

An information handling system 102 may generally be operable to receive data from and/or communicate data to one or more disk drives 130 and/or other information handling resources of chassis 101 via mid-plane 106 and/or switches 110. In certain embodiments, an information handling system 102 may be a server. In such embodiments, an information handling system 102 may comprise a blade server having modular physical design. In these and other embodiments, an information handling system 102 may comprise an M class server. As depicted in FIG. 1, an information handling system 102 may include a processor 103, one or more switch interfaces 104 communicatively coupled to processor 103, and a service processor 105 communicatively coupled to processor 103.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory, a disk drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express ("PCIe") switches, in which case a switch interface 104 may comprise a switch card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 104 for redundancy, high availability, and/or other reasons.

A service processor 105 may be implemented by, for example, a microprocessor, microcontroller, DSP, ASIC, EEPROM, or any combination thereof. Service processor 105 may be configured to communicate with one or more of chassis management controllers 112 via midplane 106 (e.g., via an Ethernet management fabric). Service processor 105 may be configured to provide out-of-band management facilities for management of information handling system 102. Such management may be made by elements of chassis 101 even if information handling system 102 is powered off or powered to a standby state. Service processor 105 may include a processor, memory, and network connection separate from the rest of information handling system 102. In certain embodiments, service processor 105 may include or may be an integral part of a baseboard management controller (BMC), chipset management engine, chipset innovation engine, or similar component.

Mid-plane 106 may comprise any system, device, or apparatus configured to interconnect modular information handling systems 102 with information handling resources. Accordingly, mid-plane 106 may include slots and/or connectors configured to receive information handling systems 102, switches 110, chassis management controllers 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102. In some embodiments, mid-plane 106 may include a single switch 110.

A chassis management controller 112 may be any system, device, or apparatus configured to facilitate management and/or control of system 100, its information handling systems 102, and/or one or more of its component information handling resources. A chassis management controller 112 may be configured to issue commands and/or other signals to manage and/or control information handling system 102 and/or information handling resources of system 100. A chassis management controller 112 may comprise a microprocessor, microcontroller, DSP, ASIC, field programmable gate array ("FPGA"), EEPROM, or any combination thereof. As shown in FIG. 1, a chassis management controller 112 may be coupled to mid-plane 106. Also as shown in FIG. 1, system 100 may include a plurality of chassis management controllers 112, and in such embodiments, chassis management controllers 112 may be configured as redundant. In some embodiments, a chassis management controller 112 may provide a user interface and high level controls for management of switches 110, including configuring assignments of individual information handling systems 102 to non-shared information handling resources of system 100. In these and other embodiments, a chassis management controller 112 may define configurations of the storage subsystem (e.g., storage controllers 114, storage interfaces 126, disk drives 130, etc.) of system 100. For example, a chassis management controller 112 may provide physical function configuration and status information that would normally occur at the driver level in traditional server implementations. Examples of physical functions include disk drive discovery and status, RAID configuration and logical volume mapping.

In addition or alternatively, a chassis management controller 112 may also provide a management console for user/administrator access to these functions. For example, a chassis management controller 112 may implement Web Services Management ("WS-MAN") or another suitable management protocol permitting a user to remotely access a chassis management controller 112 to configure system 100 and its various information handling resources. In such embodiments, a chassis management controller 112 may interface with a network interface separate from network interface 116, thus allowing for "out-of-band" control of system 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis management controller 112. In the same or alternative embodiments, chassis management controller 112 may allow an administrator to remotely manage one or more parameters associated with operation of system 100 and its various information handling resources (e.g., power usage, processor allocation, memory allocation, security privileges, etc.). Although FIG. 1 depicts chassis 101 as having two chassis management controllers 112, chassis 101 may include any suitable number of chassis management controllers 112. In many embodiments, a management controller 112 may have more processing resources than a service processor 105 of an information handling system 102, and thus, may have greater functionality than a service processor 105.

A storage controller 114 may include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), I/O routing, and error detection and recovery. As shown in FIG. 1, a storage controller 114 may be coupled to a connector on a switch 110. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, switch 110 may have coupled thereto one or more slots 120. A slot 120 may include any system, device, or apparatus configured to allow addition of one or more expansion cards to chassis 101 in order to electrically couple such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such a manner). Accordingly, a full-height riser may itself physically couple with a low profile to mid-plane 106, a switch 110, or another component, and full-height cards may then be coupled to full-height slots of a full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or another suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card ("NIC"). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network ("LAN") on motherboard ("LOM") interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface 126 may serve to permit a relatively small number of communication links (e.g., two) between storage controllers 114 and storage interfaces 126 to communicate with a greater number (e.g., 25) of disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI ("SAS") expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a disk drive backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives 130 may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc, digital versatile disc, blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as a switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display, cathode ray tube, a plasma screen, and/or a digital light processor projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

When a system (e.g., system 100) is architected so as to allow information handling resources (e.g., PCIe adapters coupled to slots 120) to be located in a chassis having shared resources such that the information handling resources may be assigned to one information handling system or shared among a plurality of information handling resources, challenges may arise when needing to service an information handling resource.

Shared resources or devices, such as PCIe adapters coupled to slots 120, may be virtualized across multiple information handling systems 102. Non-shared resources or devices may be partitioned such that they are visible only to a single information handling system 102 at a time. Chassis management controller 112 may be configured to handle routing and switching through switches 110 to affect sharing of a resource to multiple information handling systems 102 or to affect dedicated assignment of a resource to a single information handling system 102.

Figure 2:
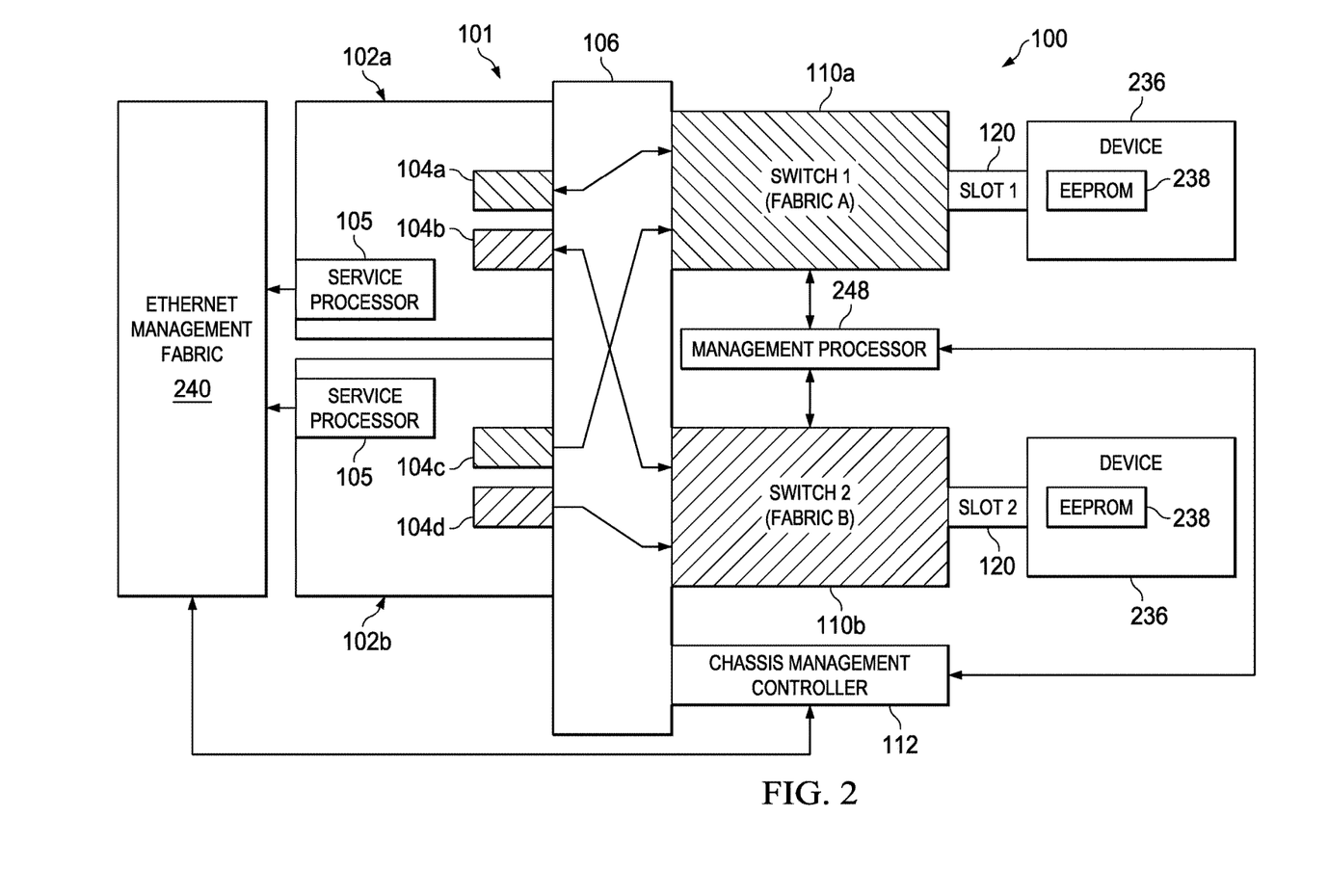
FIG. 2 illustrates a more detailed block diagram of an example system configured for switches and devices in a multi-root I/O virtualization environment for multiple information handling systems, in accordance with embodiments of the present disclosure.

FIG. 2 illustrates a more detailed block diagram of example system 100 configured for switches and devices in a multi-root I/O virtualization ("IOV") environment for multiple information handling systems 102, in accordance with embodiments of the present disclosure.

As shown in FIG. 2, chassis 101 may include a management processor 248 communicatively coupled to one or more of chassis management controller 112 and switches 110. Management processor 248 may be any system, device, or apparatus configured to facilitate management and/or control of switches 110. For example, management processor 248 may interface with a switch 110 via a sideband interface physically independent of the communications path between switch interfaces 104 and switches 110. Management processor 248 may be configured to issue commands and/or other signals to switches 110. Management processor 248 may comprise a microprocessor, microcontroller, DSP, ASIC, EEPROM, or any combination thereof. In one embodiment, management processor 248 may run a Linux operating system and include application-programming-interfaces ("APIs") for supporting configuration of IOV in system 100 for sharing devices connected to slots 120 of chassis 101 to multiple information handling systems 102. The APIs of management processor 248 may provide the interface to chassis management controller 112 for configuring IOV. Management processor 248 may be configured to manage both switches 110. In one embodiment, management processor 248 may be communicatively coupled to an Ethernet management fabric 240 and to information handling systems 102. In another embodiment, chassis management controller 112 may be communicatively coupled to the information handling systems 102 through Ethernet management fabric 240. Management processor 248 may be directly communicatively coupled to the Ethernet management fabric 240 or through, for example, chassis management controller 112.

Although FIG. 2 depicts management processor 248 operable to facilitate management and/or control of switches 110, in some embodiments of the present disclosure, one or more chassis management controllers 112 may be configured to perform the functionality of management processor 248, in which a management processor 248 independent of the chassis management controllers 112 may not be present.

Chassis 101 may include multiple information handling systems 102. Chassis 101 may include any suitable number of information handling systems 102. In some embodiments, information handling systems 102 may be referred to as "blades". Each information handling system 102 may include switch interfaces 104, and a service processor 105, as described in association with FIG. 1.

Switches 110 may contain PCIe cards instead of the typical blade Ethernet, Fibre Channel or InfiniBand cards. Switch interfaces 104 of the information handling systems 102 may couple to switches 110 through the switch interfaces 104 of switches 110. Switches 110 may couple information handling systems 102 to slots 120.

In one embodiment, each of information handling systems 102 may be communicatively coupled to each of switches 110 through one of switch interfaces 104 resident on the information handling system 102. For example, information handling system 102a may be communicatively coupled to switch 110a through switch interface 104a and to switch 110b through switch interface 104b. Information handling system 102b may be communicatively coupled to switch 110a through switch interface 104c and to switch 110b through switch interface 104d. Thus, each of switches 110 may provide its switching fabric to each of information handling systems 102 in order to route the given information handling system 102 to respective slots 120 associated with the switch 110.

Slots 120 may be configured to couple to associated devices 236, though fewer devices may be present than the associated capacity of chassis 101. Chassis 101 may include any suitable number of slots 120. In some embodiments, devices 236 may include PCIe-based cards or devices. Each such device 236 may represent an information handling resource to be selectively shared among multiple information handling systems 102 or dedicated to a single information handling system 102. A device 236 may comprise, for example, a RAID controller, network card, or other information handling resource. Furthermore, a device 236 may include a specific shared component such as a NIC. Devices 236 may include management information or circuitry configured to provide information to chassis 101 regarding the operation or specification of device 236. For example, a device 236 may include EEPROM 238 containing such information.

In order to support IOV, the driver and firmware of device 236 may include support for single root IOV (SR-IOV). To maintain routes between given information handling systems 102 and slots 120, switches 110 may include virtual hierarchies from slots 120 to information handling systems 102. Particular functions, such as virtual functions or shared functions, for SR-IOV for a given device 236 may be mapped in switch 110, providing behavior similar to multiple-root IOV (MR-IOV). Thus, in such case, a switch 110 may be considered a Multi-Root Aware (MRA) switch which bridges MR-IOV to SR-IOV so that SR-IOV virtual functions may be exposed to a node as physical functions, such that an information handling system 102 is not aware that a given device 236 is shared. In one embodiment, wherein device 236 contains multiple information handling resources such as a NIC and USB interface, a function may be provided for each such information handling resource. Thus, from the perspective of information handling systems 102, such multiple information handling resources may appear to be separate and unrelated. A given slot 120 or device 236 which has been virtualized may be accessed by two or more virtual functions, which allows the sharing of the resource. Physical functions, as opposed to the above-described virtual functions or shared functions, may be mapped or stored in management processor 248. A physical function representing an information handling resource may be provided to a single information handling system 102. In cases where a device 236 contains multiple information handling resources, individual physical functions may be provided for each such resource. Multiple instances of a virtual function may be provided to multiple information handling systems 102. If, for example, multiple information handling systems 102 are sharing a device 236, then access to device 236 may be divided into multiple virtual NICs using virtual functions, each of which are mapped by switches 110 to the respective information handling system 102. Furthermore, specific APIs for accessing a given device 236 may be mapped or stored in management processor 248. Chassis management controller 112 may be configured to access these physical functions or APIs in management processor 248.

In some embodiments of system 100, many devices 236 of the same or similar functionality may be coupled to slots 120. In addition, such devices 236 may be shared among multiple information handling systems 102 or may be dedicated to a single information handling system 102. When a device 236 is shared among multiple information handling systems 102, and such device 236 becomes degraded (e.g., fails or becomes overused beyond its capacity), such degradation can result in loss of functionality of one or more of the information handling systems 102 associated with the device 236, all the while a device 236 with the same functionality may be sitting idle or well under capacity in another slot 120. Thus, a mechanism for dynamically allocating devices 236 to information handling systems 102 may be desirable.

Because information handling resources, such as those in devices 236 coupled to slots 120, are not located within an information handling system 102, but rather in a shared chassis using switches 110 to virtualize and route I/O communications among selected information handling systems 102, allocation of such information handling resources may not be directly controlled by an associated information handling system 102. Consequently, allocation of information handling resources such as devices 236 to information handling systems 102 in chassis 101 may be conducted by chassis management controller 112. As described in greater detail below, chassis management controller 112 may be configured to allocate or otherwise direct other components of chassis 101 to allocate devices 236 to information handling systems 102. It is noted that while the functionality described herein contemplates virtualization for shared devices 236, the functionality described herein may also be extended to nonshared devices as well.

As shown in FIG. 2, system chassis 101 may include internal switching fabrics (e.g., Fabric A and Fabric B). In the embodiments represented by FIG. 2, Fabric A is associated with switch 110a (labeled "Switch 1") and Fabric B is associated with switch 110b (labeled "Switch 2"). Although not depicted in FIG. 2, storage controllers 114 may each be associated with a particular switching fabric of chassis 101 (e.g., based upon a slot or connectors via which a particular storage controller 114 is coupled to mid-plane 106).

Although the implementation of system chassis 101 with multiple information handling systems with various peripheral and I/O capabilities common to chassis 101 advantageously allows for high availability and redundant storage capabilities, multipath I/O settings must be configured in chassis 101, including configuring the various modular information handling systems 102 disposed in chassis 101. Such configuration may be complex and prone to error when manually performed by a user or administrator of chassis 101. Further complicating such configuration is that operating systems executing on individual modular information handling systems 102 must be configured to use particular information handling resources in order to effectively take advantage of multipath I/O.

In the systems depicted in FIGS. 1 and 2, a number of different communication links may be formed between an information handling system 102 and an associated device 236. In accordance with systems and methods herein disclosed, management processor 248 may operate to monitor and measure physical operational characteristics of each communication link between switches 110 and devices 236 (e.g., transmit and receive bandwidth on a per-link basis) and based on such operational characteristics, determine whether to apply an action to optimize power consumption of a link (e.g., modify width and/or speed of the links).

Figure 3:
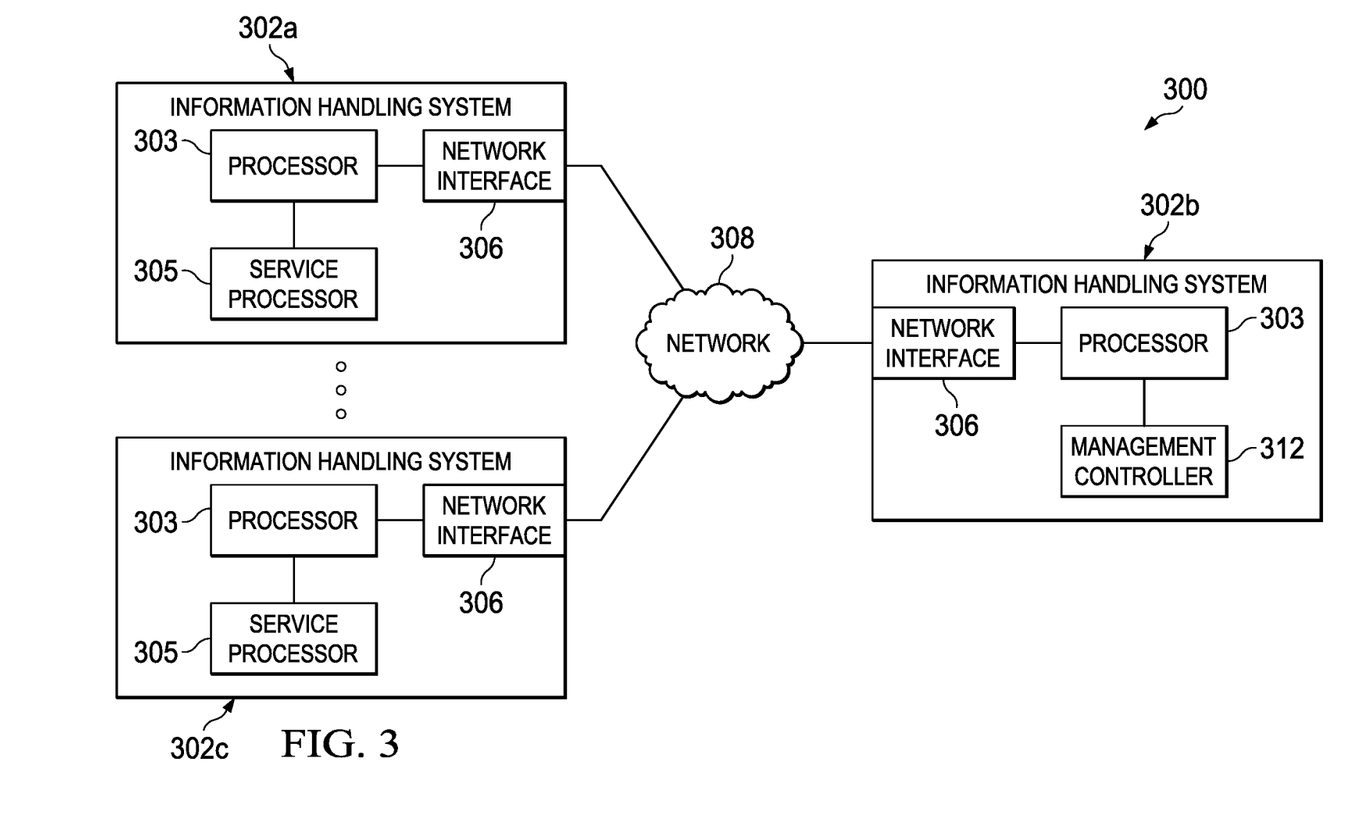
FIG. 3 illustrates a block diagram of an example enterprise network, in accordance with embodiments of the present disclosure.

FIG. 3 illustrates a block diagram of an example enterprise network 300, in accordance with embodiments of the present disclosure. As shown in FIG. 3, enterprise network 300 may comprise a plurality of information handling systems 302 (e.g., information handling systems 302a and 302b) and a network 308.

An information handling system 302 may generally be operable to receive data from and/or communicate data to one or more memories and/or one or more information handling systems 302. In certain embodiments, an information handling system 302 may be a server. In such embodiments, an information handling system 302 may comprise a blade server having modular physical design. In these and other embodiments, an information handling system 302 may comprise an M class server.

As depicted in FIG. 3, an information handling system 302a may include a processor 303, a service processor 305 communicatively coupled to processor 303, and a network interface 306.

A processor 303 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 303 may interpret and/or execute program instructions and/or process data stored in a memory.

A service processor 305 may be implemented by, for example, a microprocessor, microcontroller, DSP, ASIC, EEPROM, or any combination thereof. Service processor 305 may be configured to provide out-of-band management facilities for management of information handling system 302a. Such management may be made by elements of information handling system 302a even if information handling system 302a is powered off or powered to a standby state. Service processor 305 may include a processor, memory, and network connection separate from the rest of information handling system 302a. In certain embodiments, service processor 305 may include or may be an integral part of a baseboard management controller (BMC), chipset management engine, chipset innovation engine, or similar component.

Network interface 308 may comprise any suitable system, apparatus, or device operable to serve as an interface between information handling system 302a, network 308, and/or one or more other information handling systems. Network interface 308 may enable information handling system 302a to communicate using any suitable transmission protocol and/or standard. In these and other embodiments, network interface 308 may comprise a network interface card, or "NIC."

Information handling system 302b may be similar to information handling system 302a, except that information handling system 302b may include a management controller 312 in lieu of a service processor 305. Management controller 312 may be configured to provide out-of-band management facilities for management of information handling system 302b. Such management may be made by management controller 312 even if information handling system 302b is powered off or powered to a standby state. In certain embodiments, management controller 112 may include or may be an integral part of a remote access controller (e.g., a Dell Remote Access Controller or Integrated Dell Remote Access Controller), or an enclosure controller.

Network 308 may be a network and/or fabric configured to couple information handling systems 302 and/or one or more other information handling systems to one another. In these and other embodiments, network 308 may include a communication infrastructure, which provides physical connections, and a management layer, which organizes the physical connections and information handling systems communicatively coupled to network 308. Network 308 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 308 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 308 and its various components may be implemented using hardware, software, or any combination thereof.

In operation, a management controller (e.g., chassis management controller 112 and/or management controller 312) may execute a virtual service processor, in which the management controller may execute data processing for a service processor (e.g., service processor 105 and/or service processor 305) and instruct a service processor to carry out commands based on the data processing. Thus, a management controller may provide functionality for a service processor including programmatic and data interfaces, data management, and/or device monitoring and management, in which such functionality may not be present on a lightweight standalone service processor.

Figure 4:
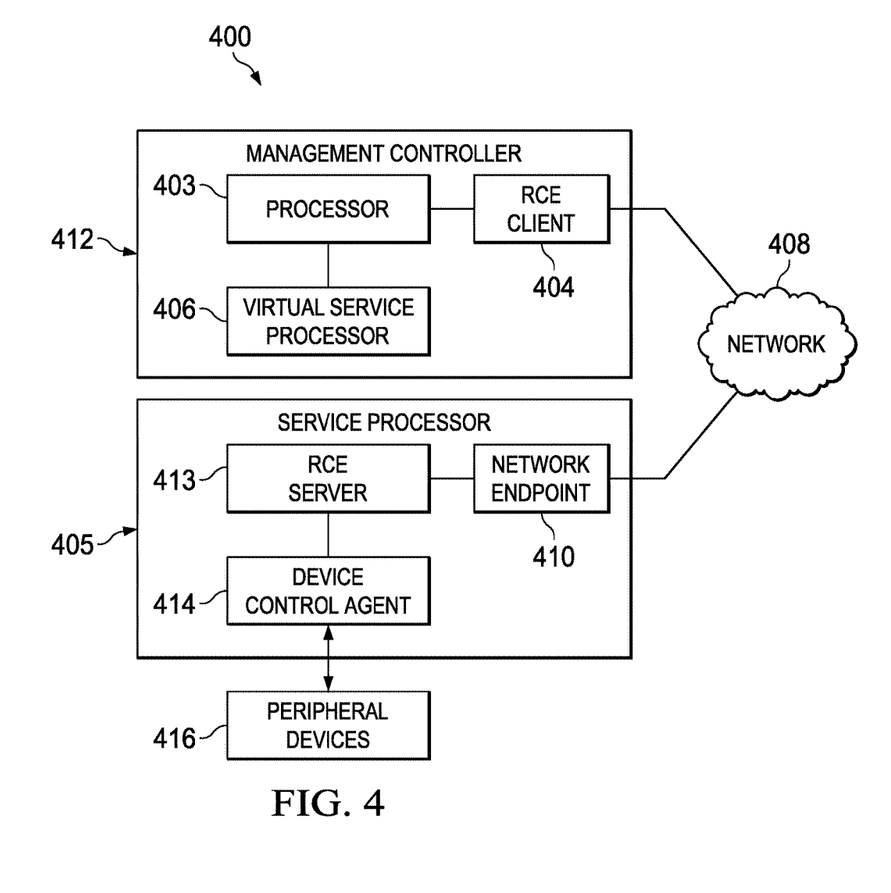
FIG. 4 illustrates a block diagram of a system for virtual service processing data bridging, in accordance with embodiments of the present disclosure.

FIG. 4 illustrates a block diagram of a system 400 for virtual service processing data bridging, in accordance with embodiments of the present disclosure. As shown in FIG. 4, system 400 may include a management controller 412, a network 408, and a service processor 405 communicatively coupled to one or more peripheral devices.

A management controller 412 may comprise a chassis management controller 112 as shown in FIGS. 1 and 2, a management controller 312 as depicted in FIG. 3, and/or any similar type of management entity. As shown in FIG. 4, management controller 412 may comprise a processor 403, an RCE client 404, and a virtual service processor 406.

Processor 403 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 403 may interpret and/or execute program instructions and/or process data stored in a memory and/or another component of management controller 412.

RCE client 404 may comprise any program of instructions configured to, when read and executed by processor 403, provide an interface between management controller 412 and service processor 405 via network 408, thus allowing management controller 412 to receive data (e.g., information from peripheral devices 416) from service processor 405 and communicate data and/or instructions to service processor 405 via RCE communications.

Virtual service processor 406 may comprise any program of instructions configured to, when read and executed by processor 403, provide for management capabilities of a service processor 405 via management controller 412. For example, in some embodiments, a virtual service processor 406 may implement a graphical user interface to allow a user interfacing with management controller 412 (e.g., via a management console remote from management controller 412, a keyboard-mouse-interface console local to management controller 412, or otherwise) to control and/or communicate with a service processor 405 in a graphical manner. In some embodiments, virtual service processor 405 may allow a user to select one or more service processors 405 to manage. If multiple service processors 405 are managed, virtual service processor 406 may allow a user to select among the managed service processors 405 and/or manage multiple service processors 405 in round robin fashion (e.g., gather data from service processors 405 one at a time).

In some embodiments, a management controller 412 may include multiple processors, multiple cores, and/or a coprocessor. In such cases, one of such processors, cores, or coprocessors may perform tasks of virtual service processor 406 while the remaining processors or cores carry out traditional management controller functionality.

A service processor 405 may comprise a service processor 105 as shown in FIGS. 1 and 2 and/or a service processor 305 as shown in FIG. 3. As shown in FIG. 4, service processor 405 may include a network endpoint 410, an RCE server 413, and device control agent 414. Network endpoint 410 may serve as a communications endpoint (e.g., an Inter-Integrated Circuit (I2C) endpoint) of management controller 412.

RCE server 413 may comprise hardware, software, and/or firmware implementing a server for communicating via RCE and with RCE client 404 instantiated on management controller 412 and may provide an interface between service processor 405 and management controller 412 via network 408, thus allowing service processor 405 to receive data (e.g., information from peripheral devices 416) from management controller 412 and communicate data and/or instructions to management controller 412 via RCE communications.

Device control agent 414 may comprise hardware, software, and/or firmware configured to communicate data and/or instructions to and/or receive data from peripheral devices 416, as described in greater detail below.

A peripheral device 416 may be communicatively coupled to service processor 405 and may generally include any information handling resource, including without limitation, a sensor (e.g., a temperature sensor). Peripheral devices 416 may be coupled to service processor 405 via an I2C bus and/or via a Peripheral Component Interconnect Express (PCIe) bus.

In operation, upon being instructed (e.g., by a user) to perform data processing of a service processor 405, a management controller 412 may initialize virtual service processor 406 and instruct the service processor 405 that it will use the service processor 405 as a communications endpoint (e.g., an I2C endpoint) and may request configuration files (e.g., I2C configuration files) of the service processor. Once a service processor 405 has been selected for control by management controller 412, the network of the service processor 405 may be caused to be inaccessible (e.g., any such external network communications are filtered out) and all management interactions will then be communicated via management controller 412. Thus, virtual service processor 406 may act as a remote management entity (e.g., as an Intelligent Platform Management Interface management entity) of service processor 405, wherein it may deliver requests (e.g., I2C requests or PCIe requests) to service processor 405 encapsulated as a payload in an Ethernet or other network datagram (e.g., frame or packet). The service processor 405 may parse such encapsulated datagram to retrieve the request payload, and deliver commands in accordance with the request payload to peripheral devices 416, as appropriate. Any response data from a peripheral device 416 may be encapsulated and communicated from the service processor 405 to the management controller 412 for processing.

Within the service processor 405, requests received at the service processor 405 may be queued within a memory (e.g., synchronous dynamic RAM) integral to or otherwise accessible to service processor 405. As such queued requests are processed, the requests may be examined for their endpoint peripheral devices 416 and delivered in accordance therewith. Thus, service processor 405 may act as a master device (e.g., I2C master or PCIe master) with peripheral devices 416 as slave devices. The service processor 405 may also receive data from peripheral devices 416 and, as needed, may queue such data in the memory integral to or otherwise accessible to service processor 405 for delivery to virtual service processor 406 of management controller 412. In some embodiments, configuration commands such as Management Component Transport Protocol (MCTP), Network Controller-Sideband Interface (NC-SI), and/or multi-root application programming interface (MR-API) commands for a network interface and/or storage I/O may be handled as well.

Although the foregoing disclosure discusses at length a chassis infrastructure with multiple blades, it is understood that the systems and methods discussed herein may also be applicable to other architectures. For example, the methods and systems disclosed herein may apply within a data center architecture in which pools of lightweight service processors may be managed and/or controlled by more powerful service processors or management controllers hosting virtual service processor stacks.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor;
a peripheral device; and
a service processor communicatively coupled to the processor and the peripheral device and configured to perform out-of-band management of the information handling system, wherein the service processor is further configured to:

17 communicatively couple to a management controller configured to perform out-of-band management of the information handling system and at least one second information handling system, wherein the management controller is configured to execute thereon a virtual service processor configured to implement a graphical user interface that is displayable on a management console for management and control of the service processor via the virtual service processor by a user of the management console;

receive a command associated with the peripheral device from the management controller, wherein the command was communicated to the management controller from the management console and relates to functionality that is not implemented on the service processor itself;

deliver the command to the peripheral device;

receive data from the peripheral device; and communicate the data to the management controller.

2. The information handling system of claim 1, wherein the management controller is integral to the second information handling system, the second information handling system being communicatively coupled to the information handling system.

3. The information handling system of claim 1, wherein the management controller is a chassis management controller integral to a chassis housing the information handling system.

4. The information handling system of claim 1, wherein the command is encapsulated in a datagram, and the service processor is configured to extract the command from the datagram.

5. The information handling system of claim 1, wherein the service processor is configured to encapsulate the data in a datagram prior to communicating the data to the management controller.

6. A method comprising:

receiving, at a service processor configured to provide out-of-band management of an information handling system and at least one second information handling system, a command associated with a peripheral device of the information handling system from a management controller communicatively coupled to the service processor, wherein the management controller has executing thereon a virtual service processor that is configured to implement a graphical user interface that is displayable on a management console for management and control of the service processor via the virtual service processor by a user of the management console, wherein the command was communicated to the management controller from the management console and relates to functionality that is not implemented on the service processor itself;

delivering the command to the peripheral device;

receiving data from the peripheral device; and communicating the data to the management controller.

7. The method of claim 6, wherein the management controller is integral to the second information handling system, the second information handling system being communicatively coupled to the information handling system.

8. The method of claim 6, wherein the management controller is a chassis management controller integral to a chassis housing the information handling system.

9. The method of claim 6, wherein the command is encapsulated in a datagram, and the method further comprises extracting the command from the datagram.

18

10. The method of claim 6, further comprising encapsulating the data in a datagram prior to communicating the data to the management controller.

11. A management controller configured to perform out-of-band management of a plurality of information handling systems via a respective plurality of service processors, comprising:

a processor; and a virtual service processor comprising a program of executable instructions embodied in non-transitory computer readable media, the virtual service processor configured to, when executed by the processor:

implement a graphical user interface that is displayable on a management console;

receive, from the management console and via the graphical user interface, a user indication of a particular service processor that the virtual service processor is to manage, wherein the particular service processor is one of the plurality of service processors;

provide, via the graphical user interface, implement a user interface for management and control of the particular service processor;

receive, from the management console, user instructions for controlling a peripheral device communicatively coupled to the particular service processor; and communicate a command to the particular service processor responsive to receiving the user instructions, the command for causing the particular service processor to communicate the command to the peripheral device, wherein the command relates to functionality implemented on the virtual service processor but not implemented on the particular service processor itself.

12. The management controller of claim 11, wherein the management controller is integral to a first information handling system communicatively coupled to a second information handling system comprising the particular service processor and the peripheral device.

13. The management controller of claim 11, wherein the management controller is a chassis management controller integral to a chassis housing an information handling system comprising the particular service processor and the peripheral device.

14. The management controller of claim 11, wherein the virtual service processor is further configured to encapsulate the command in a datagram prior to communication of the command to the particular service processor.

15. The management controller of claim 11, wherein the virtual service processor is further configured to:

receive data from the particular service processor;

process the data; and communicate a command to the particular service processor responsive to processing the data.

16. A method comprising:

implementing a user interface for management and control of a plurality of service processors communicatively coupled to a management controller configured to perform out-of-band management of at least first and second information handling systems, wherein the user interface is implemented via a virtual service processor executable on the management controller, and wherein the user interface is displayable on a management console to allow a user of the management console to interact with the plurality of service processors via the management controller;

receiving, from the management console, a user indication of a particular service processor that the virtual service processor is to manage, wherein the particular service processor is one of the plurality of service processors;

receiving, from the management console, user instructions for controlling a peripheral device communicatively coupled to the particular service processor; and communicating a command to the particular service processor responsive to receiving the user instructions, the command for causing the particular service processor to communicate the command to the peripheral device, wherein the command relates to functionality implemented on the virtual service processor but not implemented on the particular service processor itself.

17. The method of claim 16, wherein the management controller is integral to a first information handling system communicatively coupled to a second information handling system comprising the particular service processor and the peripheral device.

18. The method of claim 16, wherein the management controller is a chassis management controller integral to a chassis housing an information handling system comprising the particular service processor and the peripheral device.

19. The method of claim 16, further comprising encapsulating the command in a datagram prior to communication of the command to the particular service processor.

20. The method of claim 16, further comprising:
receiving data from the particular service processor;
processing the data; and
communicating a command to the particular service processor responsive to processing the data.

* * * * *

UNITED STATES PATENT AND TRADEMARK OFFICE
CERTIFICATE OF CORRECTION

PATENT NO. : 10,430,351 B2
APPLICATION NO. : 15/072927
DATED : October 1, 2019
INVENTOR(S) : Gupta et al.

Page 1 of 1

It is certified that error appears in the above-identified patent and that said Letters Patent is hereby corrected as shown below:

In the Claims

Column 18, Lines 4-35, please amend Claim 11 as follows:
11. A management controller configured to perform out-of-band management of a plurality of information handling systems via a respective plurality of service processors, comprising:
 a processor; and
a virtual service processor comprising a program of executable instructions embodied in non-transitory computer readable media, the virtual service processor configured to, when executed by the processor:
  implement a graphical user interface that is displayable on a management console;
  receive, from the management console and via the graphical user interface, a user indication of a particular service processor that the virtual service processor is to manage, wherein the particular service processor is one of the plurality of service processors;
  provide, via the graphical user interface, a user interface for management and control of the particular service processor;
  receive, from the management console, user instructions for controlling a peripheral device communicatively coupled to the particular service processor; and
  communicate a command to the particular service processor responsive to receiving the user instructions, the command for causing the particular service processor to communicate the command to the peripheral device, wherein the command relates to functionality implemented on the virtual service processor but not implemented on the particular service processor itself.

Signed and Sealed this
Fourth Day of February, 2020

Andrei Iancu
*Director of the United States Patent and Trademark Office*